(12) United States Patent
Myhre et al.

(10) Patent No.: US 7,987,712 B2
(45) Date of Patent: Aug. 2, 2011

(54) HIGH TEMPERATURE SEAL ASSEMBLY FOR OPTICAL SENSOR

(75) Inventors: Douglas C. Myhre, Eden Prairie, MN (US); Joseph R. Michel, St. Paul, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 237 days.

(21) Appl. No.: 12/316,136

(22) Filed: Dec. 10, 2008

(65) Prior Publication Data

US 2010/0140373 A1 Jun. 10, 2010

(51) Int. Cl.
*G01D 11/24* (2006.01)
(52) U.S. Cl. ............ 73/431; 73/35.07; 356/256; 239/74
(58) Field of Classification Search ............. 73/431, 73/35.07; 250/239; 239/74; 356/256
See application file for complete search history.

(56) References Cited

U.S. PATENT DOCUMENTS

| | | | |
|---|---|---|---|
| 3,689,773 A | 9/1972 | Wheeler | |
| 4,521,088 A * | 6/1985 | Masom | 359/507 |
| 4,573,761 A * | 3/1986 | McLachlan et al. | 385/115 |
| 5,033,666 A | 7/1991 | Keusseyan et al. | |
| 5,071,105 A | 12/1991 | Donze et al. | |
| 5,317,165 A | 5/1994 | Montagna | |
| 5,608,515 A | 3/1997 | Shu et al. | |
| 5,670,784 A | 9/1997 | Cusack et al. | |
| 5,763,888 A | 6/1998 | Glasheen et al. | |
| 5,929,450 A | 7/1999 | Glasheen et al. | |
| 5,944,656 A * | 8/1999 | Pollack et al. | 600/176 |
| 5,961,314 A | 10/1999 | Myhre et al. | |
| 5,992,728 A * | 11/1999 | Pollack et al. | 228/122.1 |
| 6,111,398 A * | 8/2000 | Graham | 324/71.4 |
| 6,131,465 A | 10/2000 | Wlodarczyk et al. | |
| 6,503,196 B1 * | 1/2003 | Kehr et al. | 600/176 |
| 6,759,590 B2 | 7/2004 | Stark | |
| 7,007,547 B2 | 3/2006 | Philipp et al. | |
| 7,281,382 B2 * | 10/2007 | Plimpton et al. | 60/779 |
| 7,334,413 B2 | 2/2008 | Myhre | |
| 7,391,433 B2 | 6/2008 | Pollack | |
| 7,484,369 B2 | 2/2009 | Myhre | |
| 2002/0134138 A1 | 9/2002 | Philipp et al. | |
| 2005/0247066 A1 | 11/2005 | Myhre | |
| 2006/0059917 A1 | 3/2006 | Plimpton et al. | |
| 2007/0119147 A1 | 5/2007 | Cornwell et al. | |
| 2008/0211373 A1 | 9/2008 | Karst et al. | |

OTHER PUBLICATIONS

Uk Intellectual Property Search Report dated Feb. 26, 2010.

(Continued)

*Primary Examiner* — Christopher Kim
(74) *Attorney, Agent, or Firm* — Scott D. Wofsy; Edwards Angell Palmer & Dodge LLP

(57) ABSTRACT

A seal assembly for an optical sensor employed in a high temperature environment is disclosed which includes an elongated metal guide tube having a distal end portion defining an open distal end and an inner rear wall, a sapphire window disposed within the distal end portion of the metal guide tube, the sapphire window having a rear end surface abutting the inner rear wall of the distal end portion of the metal guide tube, and a platinum mounting sleeve for securing the sapphire window to the metal guide tube, the platinum mounting sleeve having one portion joined to the metal guide tube and another portion joined to the sapphire window.

8 Claims, 3 Drawing Sheets

OTHER PUBLICATIONS

"Taking Optical Probes into Harsh Environments," Pollack, Michael and Bates, Stephen C., Sensors Magazine—May 2000, http://archives.sensorsmag.com/articles/0600/76/main.shtml, Aug. 20, 2008.

Product Information Sheet for "Sapphire Viewports," Adcap Vacuum Tech. Co. Ltd. website, http://www.adcap-vacuum.com/Sapphire%20Tecpage1.html, Aug. 20, 2008.

* cited by examiner

HIGH TEMPERATURE SEAL ASSEMBLY FOR OPTICAL SENSOR

GOVERNMENT RIGHTS STATEMENT

The U.S. Government has a paid-up license in this invention and the right in limited circumstances to require the patent owner to license others on reasonable terms as provided for by the terms of FA8650-07-C-2796, awarded by the Air Force Research Laboratory.

BACKGROUND OF THE INVENTION

1. Field of the Invention

The subject invention is directed to a seal assembly for an optical sensor employed in a high temperature environment, and more particularly, to a seal assembly for an optical sensor employed in a fuel injector of a gas turbine engine.

2. Description of Related Art

Over the past decade, there has been increased use of optical probes to monitor industrial processes taking place in harsh environments. Examples include optical pyrometers for measuring temperature and fiber optic spectrometers for measuring chemical compositions. To protect and otherwise extend the operational life of these optical probes, they are often housed in a hermetically sealed shroud. The protective shroud typically has a viewing port or window, which is commonly made of synthetic sapphire. Sapphire provides a superior electromechanical, thermal and chemical properties as compared with glass or quartz.

Optical sensors with sapphire viewing ports for monitoring combustion processes in the combustion chamber of a gas turbine engine are known in the art, as disclosed for example in U.S. Pat. No. 7,007,547 to Philipp et al., wherein a sapphire lens is soldered in place within a steel sleeve by way of a ceramic-metal mix. However, it has been determined that a ceramic-to-metal seal is very sensitive to thermal expansion, and thus not suitable for applications in which the optical sensor is located in close proximity to a combustion flame, where temperatures can reach as high as 1400° F. (760° C.).

In many optical sensors used in gas turbine engines, the sapphire window is brazed into a sealing flange or mounting fixture. For example, U.S. Pat. No. 5,929,450 to Glasheen et al. discloses an optical flame sensor for flame detection in a gas turbine engine. The sensor is disposed in a housing assembly and situated in the engine wall for detecting the presence of flame in the combustion chamber or for determining when afterburner light-off as been achieved in the nozzle section. The housing assembly includes a sapphire lens assembly disposed within and laser welded to a lens holder. The lens holder is fabricated from Kovar, a proprietary alloy which accommodates the thermal expansion of the sapphire.

While a seal between a Kovar lens holder and a sapphire window is quite effective when situated in the wall of a gas turbine engine, it would not withstand the operating temperatures that are present in close proximity to the combustion flame. For example, U.S. Pat. No. 7,334,413 to Myhre discloses an optical sensor array located within a fuel nozzle for observing combustion conditions within the combustor of a gas turbine engine. The sensor array includes a bundle of optical fibers that are located within a stainless steel guide tube. The guide tube is positioned within a viewing port formed in the leading edge surface of the fuel nozzle. A sapphire window is joined to the end of the guide tube to seal the tube and protect the fiber bundle from the combustion flame.

A conventional Kovar-to-sapphire braze seal, as disclosed for example in Glasheen et al., would be ineffective in this harsh environment. Therefore, it would be beneficial to provide a robust metal-to-sapphire seal assembly that is capable of withstanding the high temperature environment that exist in close proximity to the combustion flame within the combustion chamber of a gas turbine engine.

SUMMARY OF THE INVENTION

The subject invention is directed to a new and useful seal assembly for an optical sensor employed in a high temperature environment, such as, for example, within the combustion chamber of a gas turbine engine. The novel seal assembly of the subject invention includes an elongated metal guide tube having an open distal end portion. A sapphire window is disposed within the distal end portion of the metal guide tube and a platinum mounting sleeve secures the sapphire window to the metal guide tube, to provide a hermetic seal.

More particularly, the platinum mounting sleeve has one end portion joined to the metal guide tube and another end portion joined to the sapphire window. Preferably, a forward end portion of the platinum mounting sleeve is joined to the metal guide tube by a braze joint, and a rearward end portion of the platinum mounting sleeve is joined to the outer peripheral surface of the sapphire window by a glass joint.

In a preferred embodiment of the subject invention, the high temperature seal assembly is associated with a fuel injector for a gas turbine engine. Accordingly, the subject invention is directed to a fuel injector that includes a nozzle body having a leading edge surface with an optical viewing port formed therein. An elongated metal guide tube is disposed within the optical viewing port of the nozzle body, and an elongated sapphire rod is seated within a distal end portion of the metal guide tube. A platinum mounting sleeve secures the sapphire rod to the guide tube in the manner described above.

These and other features of the subject invention will become more readily apparent to those having ordinary skill in the art from the following detailed description of the invention taken in conjunction with the several drawings described below.

BRIEF DESCRIPTION OF THE DRAWINGS

So that those skilled in the art to which the subject invention appertains will readily understand how to make and use the metal-to-sapphire seal assembly of the subject invention without undue experimentation, preferred embodiments thereof will be described in detail below with reference to certain figures, wherein.

DESCRIPTION OF THE PREFERRED EMBODIMENTS

Figure 1:
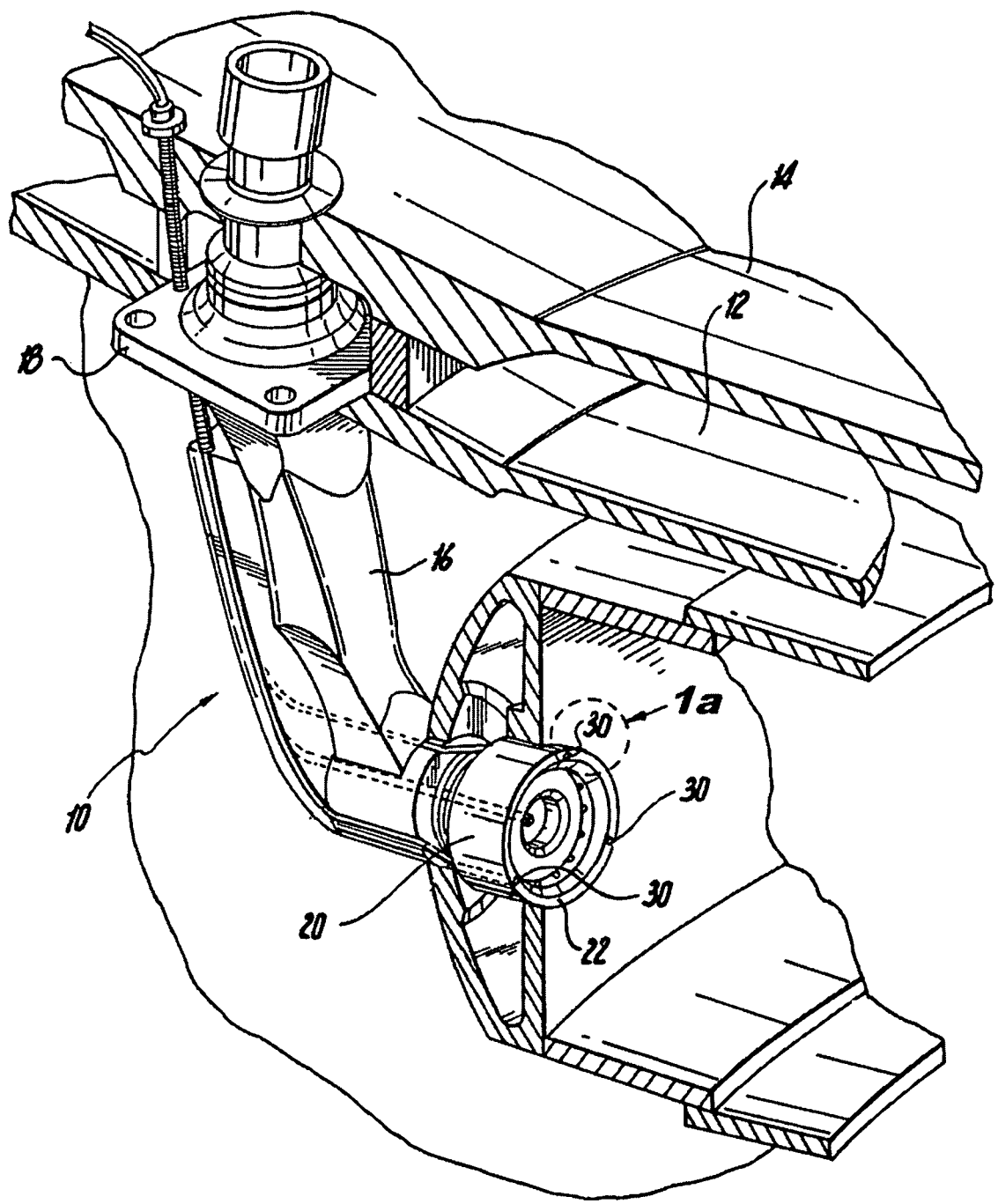
FIG. 1 is a perspective view of a fuel injector that includes an optical sensor for observing combustion conditions in the combustion chamber of gas turbine engine, wherein that optical sensor is located in a viewing port formed in the leading edge surface of the injector nozzle and has a window with a seal assembly constructed in accordance with a preferred embodiment of the subject invention.

Referring now to the drawings wherein like reference numerals identify similar structural features or elements of the subject invention, there is illustrated in FIG. 1 an instrumented fuel injector configured in accordance with a preferred embodiment of the subject invention and designated generally by reference numeral 10.

Fuel injector 10 is of type disclosed in commonly assigned U.S. Pat. No. 7,334,413 to Myhre, the disclosure of which is herein incorporated by reference in its entirety. In brief, fuel injector 10 is mounted or otherwise supported within the combustion chamber 12 of gas turbine engine 14 in a conventional manner. Fuel injector 10 includes an elongated feed arm 16 having a support flange 18 for mounting the injector within the combustion chamber 12. A fuel nozzle 20 depends from the distal end of feed arm 16 and is designed to inject or otherwise issue atomized fuel into the combustion chamber 12.

Figure 1A:
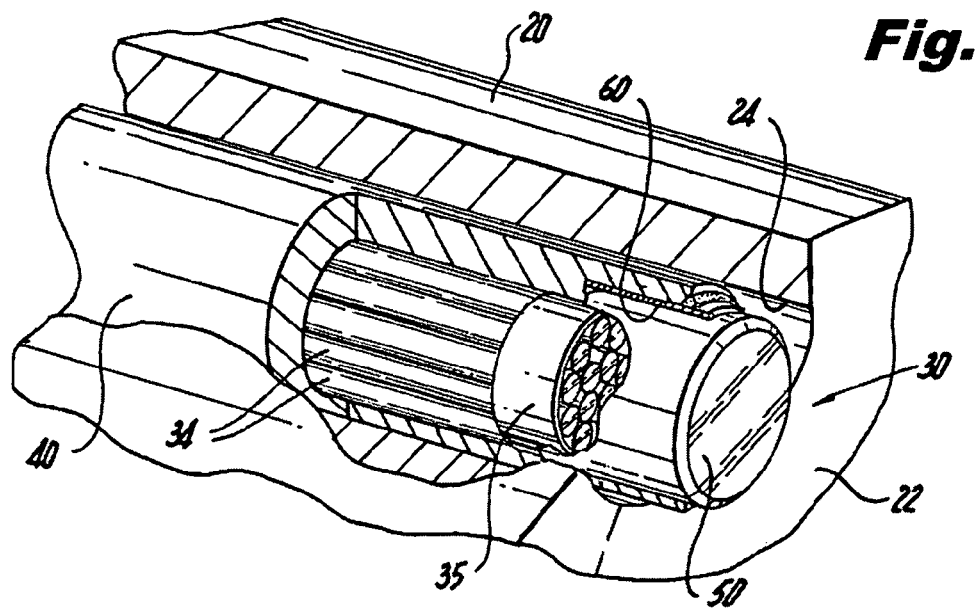
FIG. 1a is a cross-sectional view of a portion of the nozzle body of the fuel injector illustrating the protective guide tube assembly which houses the fiber array of the optical sensor, wherein a sapphire window is joined to the distal end of the guide tube using the seal assembly of the subject invention.

In accordance with a preferred embodiment of the subject invention, fuel injector 10 includes a plurality of circumferentially disposed optical sensors 30, that are located in corresponding viewing ports 24 formed in the leading edge surface 22 of fuel nozzle 20. The optical sensors 30 are adapted and configured to observe combustion conditions within the combustion chamber 12 of gas turbine 14, downstream from the fuel nozzle 20, as best seen in FIG. 1a and described in U.S. Pat. No. 7,334,413 to Myhre.

Referring to FIG. 1a, the optical sensors 30 are defined, in pertinent part, by a bundle of gold-coated optical fibers 34. The bundle of coated fibers 34 are disposed within an elongated guide tube 40, which provides thermal and mechanical protection for the fibers. Preferably, the guide tube 40 is formed from stainless steel or from a nickel alloy such as, for example, Inconel or a similar temperature resistant material.

More particularly, the distal end portion of fiber bundle 34 is held together by a small platinum or platinum alloy tube 35 that is swaged around the fibers. The distal end of the swaged tube 35 is polished, and together with the fiber bundle 34, it is held in place within the guide tube 40 by a compressive force that is applied during installation. The assembled guide tube 40 is then mechanically secured within the viewing port 24 of fuel nozzle 20.

The optical fibers 34 and swaged tube 35 terminate at a location spaced from the distal end of the guide tube 40. An elongated rod-shaped window 50 is positioned distal to the optical fibers 34, in a cylindrical seat 42 formed within the distal end portion of guide tube 40. The distal end of fiber bundle 34 together with the polished distal end of tube 35 abut the rearward end of window 50.

Figure 2:
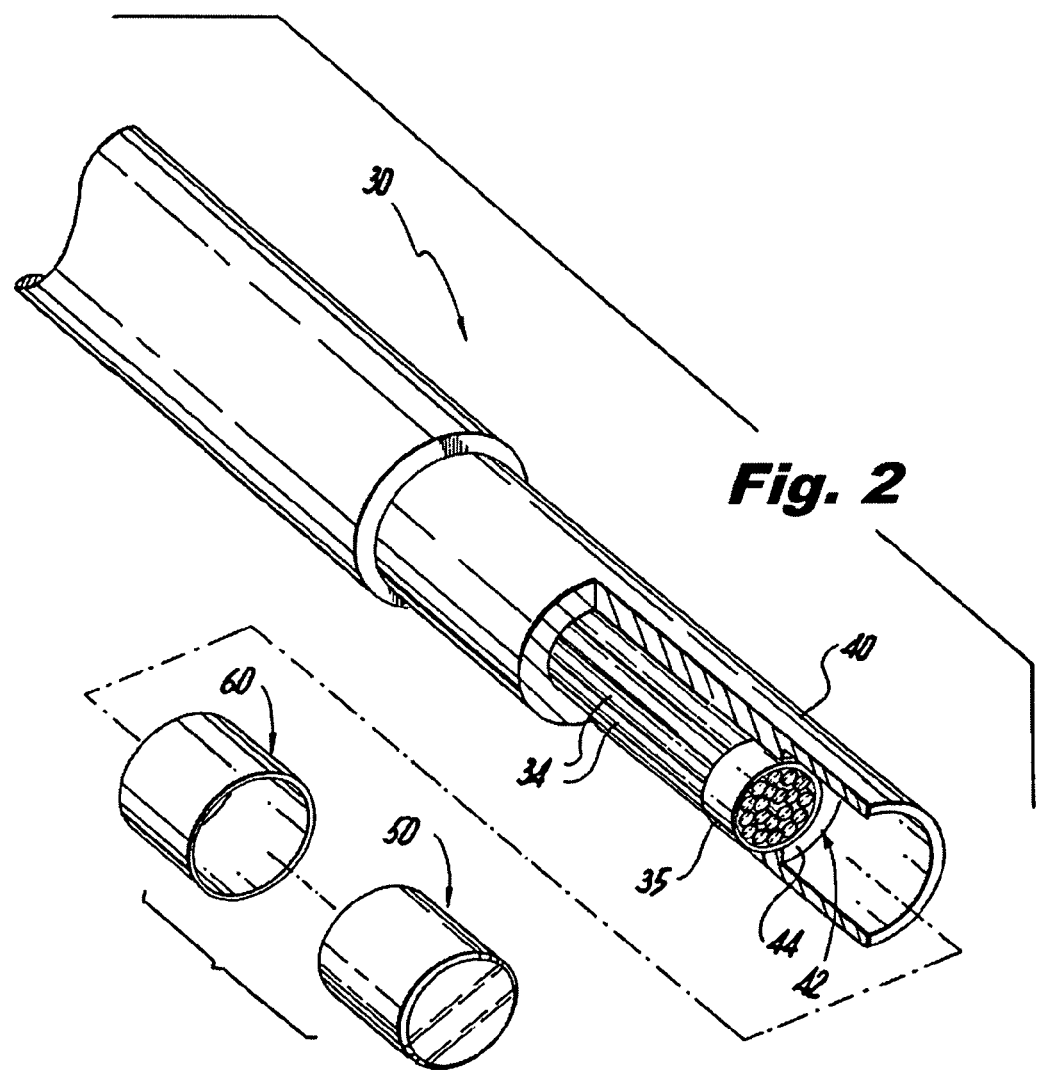
FIG. 2 is a perspective view of the protective guide tube assembly shown in FIG. 1a, with the sapphire window and platinum mounting sleeve separated from the distal end portion of the guide tube to illustrate the seat that accommodates the window and sleeve.

As best seen in FIG. 2, the seat 42 includes a rear wall surface or shoulder 44, and the rearward end of the window 50 abuts the rear wall surface 44 of the seat 42. By positioning the rearward end of the window 50 against the shoulder 44, the window 50 is able to withstand the external pressures "P" that exist within the combustion chamber 12 of a gas turbine engine 14, which can reach as high as 900 psi, as illustrated for example in FIG. 3.

Figure 3:
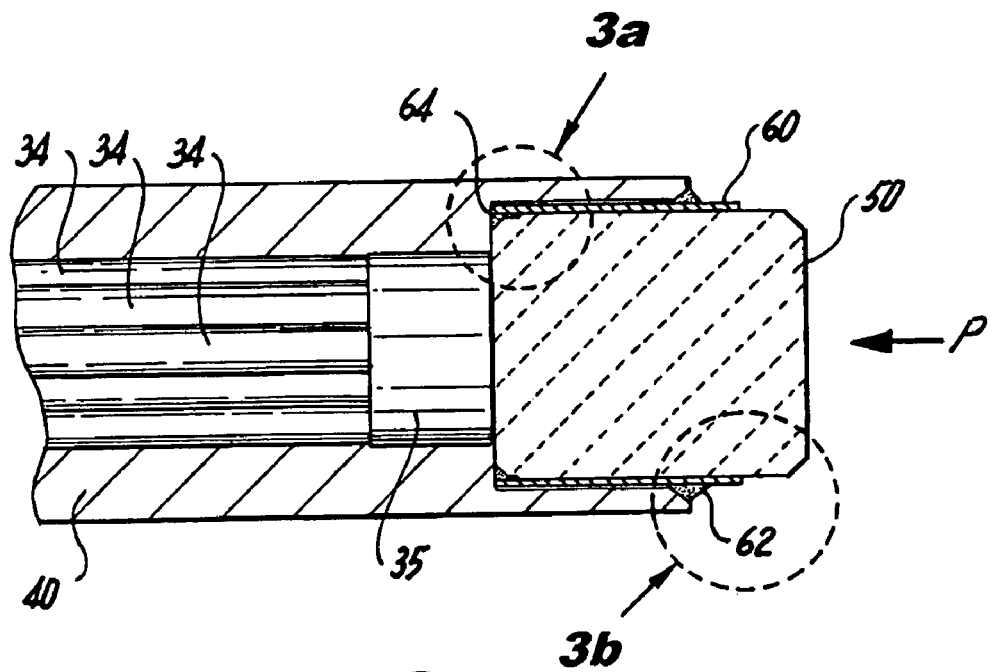
FIG. 3 is an enlarged localized cross-sectional view of the distal end portion of the guide tube assembly, illustrating the high temperature metal-to-sapphire seal assembly of the subject invention.

As shown in FIG. 3, the forward end of window 50 extends beyond the distal end of mounting tube 40 so that it is positioned in such a manner so as to gain flame exposure sufficient to advantageously oxidize soot deposits thereon, as disclosed for example in commonly assigned U.S. Patent Application Publication 2006-0000219-A1, the disclosure of which is incorporated herein by reference in its entirety.

The window 50 is formed from optically transparent synthetic sapphire or a similar optically transparent material and it functions to hermetically seal the end of the guide tube 40. In doing so, it protects the optical fibers bundle 34 from contamination and combustion by-products, which could degrade or otherwise harm them.

As best seen in FIG. 3, the sapphire window 50 is securely mounted within the seat 42 formed in the distal end portion of the metal guide tube 40 by way of a cylindrical mounting sleeve 60. Mounting sleeve 60 is preferably formed from platinum or an alloy thereof. Platinum is preferred because it is a relatively malleable metal enabling it to provide good sealing characteristics with respect to the sapphire window 50 and metal guide tube 40, as discussed in greater detail below.

Referring to FIG. 3, a forward end portion of the platinum mounting sleeve 60 is joined to the metal guide tube 40 to form a hermetic seal at the front end of the seat 42 and a rearward end portion of mounting sleeve 60 is joined to the sapphire window 50 to form a hermetic seal 64 at the rear end of the seat 42 adjacent the optical fibers 34. More particularly, as shown in FIG. 3b, the forward end portion of the platinum mounting sleeve 60 is joined to the metal guide tube 40 by brazing 62. An exemplary braze would include 28% nickel and 72% copper.

Figure 3A:
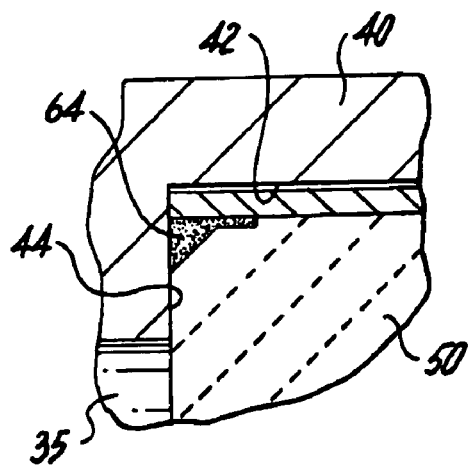
FIG. 3a is an enlarged localized view of the glass joint between the platinum mounting sleeve and the sapphire window.
Figure 3B:
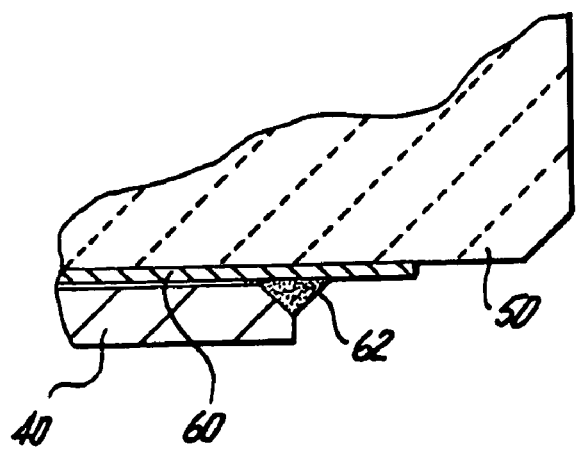
FIG. 3b is an enlarged localized cross-sectional view of the braze joint between the platinum sleeve and the sapphire window.

As best seen in FIG. 3a, the rearward end portion of the platinum mounting sleeve 60 is joined at 64 to the outer peripheral surface of the sapphire window 50 using a high temperature glass. Glass is preferable because it adheres well to the outer surface of the sapphire window 50. Furthermore, sapphire and platinum have similar thermal expansion characteristics. That is, sapphire and platinum have relatively matched coefficients of linear thermal expansion.

During assembly, the glass that is used to join the sapphire window to the platinum sleeve is introduced into the assembly as a frit in a liquid carrier. The glass frit liquefies when heated, and the glass flows by capillary action into a small gap between the window 50 and the mounting sleeve 60, as illustrated in FIG. 3a.

The relatively malleable platinum mounting sleeve 60 provides a thermal expansion buffer between the sapphire window 50 and the metal guide tube 40. This allows the two materials to expand relative to one another under the extreme operating temperatures that are present proximate to the combustor flame, without effecting the integrity of the glass seal 64 located at the rearward end of the window. Thus, despite the thermal expansion differences between the metal guide tube 40 and sapphire window 50, the platinum mounting sleeve 60 keeps the glass seal 64 intact. That is, the malleability of the platinum mounting sleeve 60, accommodates the relatively unmatched linear thermal expansion coefficients of Inconel® and sapphire.

Those skilled in the art will readily appreciate that there is suitable dimensional clearance between the outer diameter of mounting sleeve 60 and the inner diameter of the seat 42 formed at the distal end of guide tube 40 to accommodate the relative thermal expansion of the two components, both linearly and radially.

While the subject invention has been shown and described with reference to preferred embodiments, those skilled in the art will readily appreciate that various changes and/or modifications may be made thereto without departing from the spirit and/or scope of the subject disclosure.

What is claimed is:

1. A seal assembly for an optical sensor comprising:
   a) an elongated metal guide tube formed from a nickel based alloy and having a distal end portion defining an open distal end and an inner rear wall;
   b) a sapphire window disposed within the distal end portion of the metal guide tube, the sapphire window having a rear end surface abutting the inner rear wall of the distal end portion of the metal guide tube;
   c) a mounting sleeve formed from platinum or an alloy thereof for securing the sapphire window to the metal guide tube, the mounting sleeve having one portion joined to the metal guide tube and another portion joined to the sapphire window; and
   d) a hermetic glass seal located between an outer peripheral surface of the sapphire window and the rear end portion of the mounting sleeve, wherein the mounting sleeve provides a thermal expansion buffer between the metal guide tube and the sapphire window to keep the glass seal intact at operating temperatures.

2. A seal assembly as recited in claim 1, wherein a forward end portion of the mounting sleeve is joined to the metal guide tube.

3. A seal assembly as recited in claim 2, wherein the forward end portion of the mounting sleeve is joined to the metal guide tube by a braze joint.

4. A seal assembly as recited in claim 1, wherein a rearward end portion of the mounting sleeve is joined to the sapphire window.

5. A seal assembly as recited in claim 4, wherein the rearward end portion of the mounting sleeve is adhered to the sapphire window by the glass seal.

6. A seal assembly as recited in claim 1, wherein the rear end surface of the sapphire window is in optical communication with optical fibers disposed within the metal guide tube.

7. A seal assembly as recited in claim 1, wherein the sapphire window is in the form of an elongated sapphire rod.

8. A seal assembly as recited in claim 7, wherein a forward end portion of the elongated sapphire rod extends outwardly from the open distal end of the guide tube.

* * * * *